A. H. SMITH & R. RIGBY.
LATHE.
APPLICATION FILED JULY 12, 1909.
952,149.
Patented Mar. 15, 1910.
2 SHEETS—SHEET 1.
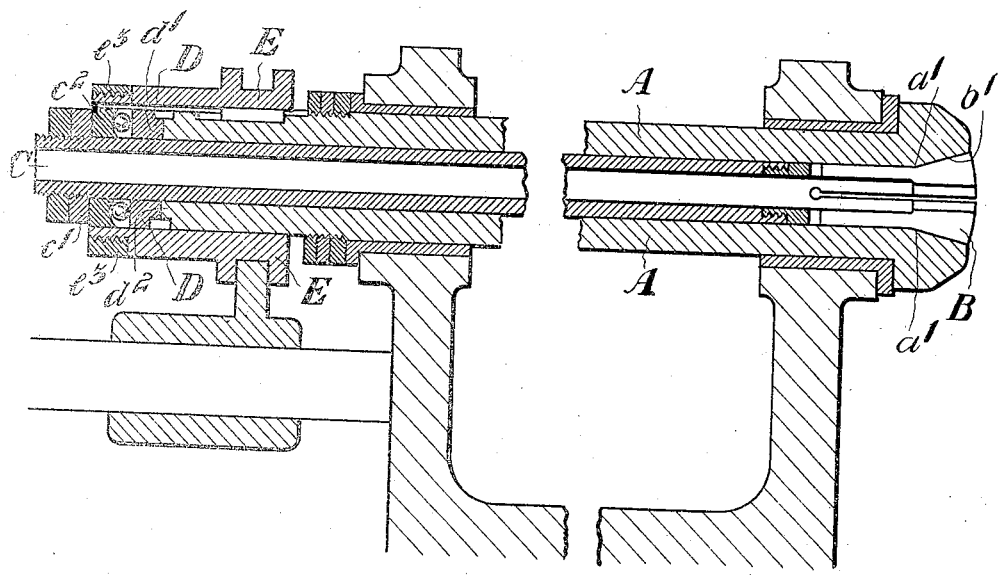
FIG. 1
FIG. 3
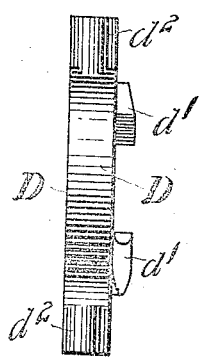
FIG. 5
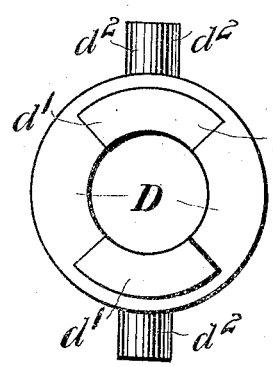
FIG. 4
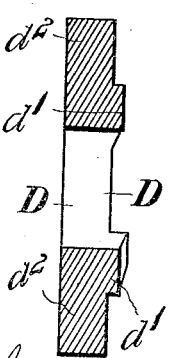
Witnesses:
C. Heymann
A. Singer
Inventors:
Albert Henry Smith
Robert Rigby
by B. Singer atty.

A. H. SMITH & R. RIGBY.
LATHE.
APPLICATION FILED JULY 12, 1909.

952,149.

Patented Mar. 15, 1910.
2 SHEETS—SHEET 2.

Witnesses
C. Heymann
A. Singer

Inventors
Albert Henry Smith
Robert Rigby
by B. Singer atty

UNITED STATES PATENT OFFICE.

ALBERT HENRY SMITH, OF WEST SMETHWICK, AND ROBERT RIGBY, OF BIRMINGHAM, ENGLAND.

LATHE.

952,149.  Specification of Letters Patent.  Patented Mar. 15, 1910.

Application filed July 12, 1909. Serial No. 507,132.

*To all whom it may concern:*

Be it known that we, ALBERT HENRY SMITH, mechanical engineer, and ROBERT RIGBY, metal manufacturer, citizens and residents of, respectively, 6 Spon Lane, West Smethwick, in the county of Stafford, and New John Street Metal Works, Birmingham, in the county of Warwick, England, have invented certain new and useful Improvements in Lathes, of which the following is a specification.

This invention relates to improvements in lathes but has more particular reference to what are generally known as capstan lathes, its object being to provide improved means on such lathes for facilitating gripping or releasing of the work, thus effecting the more rapid production of work.

The invention essentially consists in the provision of coacting inclined surfaces, one set on the end of the work spindle remote from the work holder and the other set on a collar keyed to the sleeve working through the spindle and connected with the work holder. The collar is engaged by an outer sleeve having an inclined groove or by a similar arrangement so that axial movement of the sleeve or the like rotates the collar and by the coaction of the inclined faces effects relative movement between the work spindle and the sleeve connected with the work holder. As is usual in this class of lathe, the holder has a taper outer end which is engaged by a corresponding formation in the end of the spindle, thus movement of the two in opposite directions cause the contracting of the holder so that it grips onto the work.

The improved means for operating the holder enable variations in the external diameter of work to be conveniently dealt with and the operation of gripping or releasing is positively and quickly accomplished.

Figure 2:
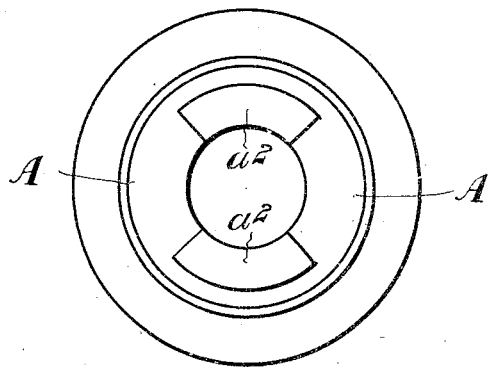
Figure 6:
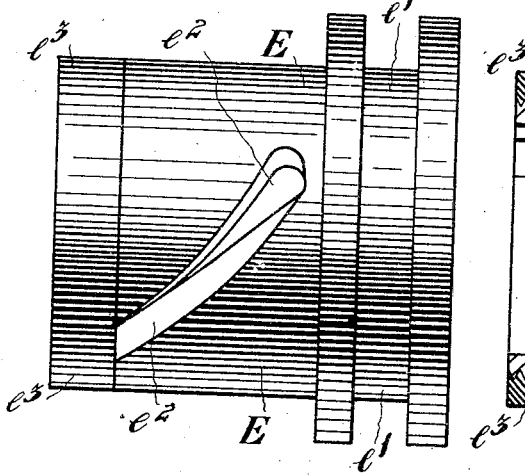
Figure 7:
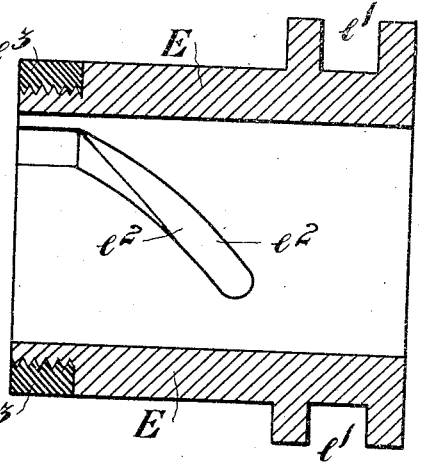
Figure 8:
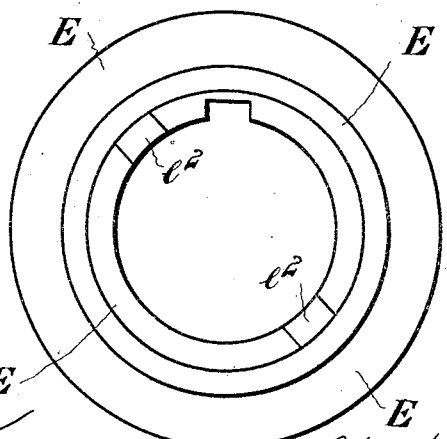

On the drawings:—Figure 1 is a section of a lathe work spindle with the invention applied, the holder being in the closed position. Fig. 2. is an end view of the work spindle showing the inclined faces formed thereon. Figs. 3, 4, and 5. show respectively edge view, section and face view of the collar. Fig. 6. is an elevation. Fig. 7. is a section, and Fig. 8. an end view of the sleeve for operating the collar.

A is the main spindle, B the work holder and C is a hollow shaft inside the spindle for operating the work holder. The work holder is split as usual, is coned on its outer surface $b^1$, and is located in a correspondingly coned part $a^1$ of the spindle A. As will be seen no mechanism for locking the work holder is arranged at this end of the spindle and consequently the work is close up to the bearing and greater stability is secured. The means for locking the work are arranged at the other end of the spindle and consist of a loose collar D arranged on the shaft C carrying inclined faces $d^1$ adapted to engage and coact with inclined faces $a^2$ on the end of the spindle A. The collar D as stated is loose on the shaft C, but is adapted for axially moving the shaft when suitably operated, so as to cause the shaft to draw the holder B farther into the spindle and by reason of the coned contours $a^1$ $b^1$ to contract it onto the work.

To enable the collar D to shift the shaft C we provide locked screw collars $c^1$ on the end of the shaft, and we provide a thrust ball race $c^2$ between the collar D and these screw collars $c^1$. The collar D may thus have additional rotation without interfering with the speed of rotation of the shaft This additional rotation is necessary to able the collar D being moved with its inclines relatively to the inclines $a^2$ on the spindle A, for instance when adjusting the grip onto the work during operation. The rotation of the collar D relative to the spindle A brings the inclined faces $d^1$ and $a^2$ into coaction and as they ride up each other the collar D is moved axially transmitting this axial movement through the thrust collars $c^1$ to the shaft C and drawing the holder B into the spindle with the previously mentioned result of contracting it. The means we have here shown for effecting this rotation of the collar D comprise an outer sleeve E; this has the usual fork groove $e^1$ for enabling it to be readily moved axially by a hand lever or in the case of automatic machines, by a roller on the fork end engaging a cam path, acting against a spring which effects the return. The sleeve E is provided with inclined slots or grooves $e^2$ and the collar D is provided with trunnion pins $d^2$ for working in these slots. Thus as the sleeve is moved, the slots carry around the pins and the collar, and the inclines on the collar are smoothly and gradually brought into action with the inclines on the spindle end. By giving a fair length and gradual incline to the slots $e^2$ and the engaging faces $a^2$ $d^1$ considerable adjustability is given to the holder enabling it efficiently gripping work of varying diameter. When applied on automatic machines only a fraction of the rotation of the cam shaft is necessary for operating the holder with this device instead of about one third, thus effecting considerable gain in the output of the work of the machine.

As shown the sleeve E is conveniently formed with the slots $e^2$ having entrance slots from the end, and a screwed collar $e^3$ is made use of to close these slots when the pins $d^2$ of the collar are inserted therein. This is a preferable arrangement to forming the pins $d^2$ detachable from the collar, which would otherwise be necessary as the collar is stronger with the pins integral and possesses greater durability in use than would be possible with the employment of screw pins subjected to shearing strains.

We may if desired arrange a spring behind the collar D so as to come between it and the thrust collar $c^1$ to obviate shock.

What we claim then is:

1. A lathe comprising in combination, a spindle provided with tapered or cam portions on one end and an internally cone shaped head at the other end, a collar provided with tapered or cam portions coacting with the cam portions of said spindle, a cone shaped chuck or work holder in said head, a shaft connected with said chuck and arranged to be moved axially by said collar, and means non-rotatively mounted on said spindle for rotating said collar to engage said cam portions and impart axial movement to said chuck.

2. A lathe comprising in combination, a spindle provided with tapered or cam portions on one end and a hollow head on the other end, a collar provided with cam portions adapted for coaction with the cam portion of said spindle, a chuck or work holder in said head, a shaft connected with said chuck and arranged to be actuated by said collar, and a sleeve non-rotatively and slidably mounted on said spindle for rotating said collar to impart axial movement to said chuck.

3. A lathe comprising in combination, a spindle provided with tapered or cam portions on one end and a hollow head on the other end, a collar provided with cam portions coacting with the cam portions of said spindle, and trunnions projecting therefrom, a cone shaped chuck or work holder in said head, a shaft connected with said chuck, an anti-friction thrust device operatively interposed between said collar and shaft, and a sleeve non-rotatively and slidably mounted on said spindle and provided with cam slots for receiving said trunnion and actuating said collar.

Signed at Birmingham in the county of Warwick this 30th day of June A. D. 1909.

ALBERT HENRY SMITH.
ROBERT RIGBY.

Witnesses:
J. BEAUMONT PERCIVAL,
EDGAR SIMS BRETTELL.